Figure 1:
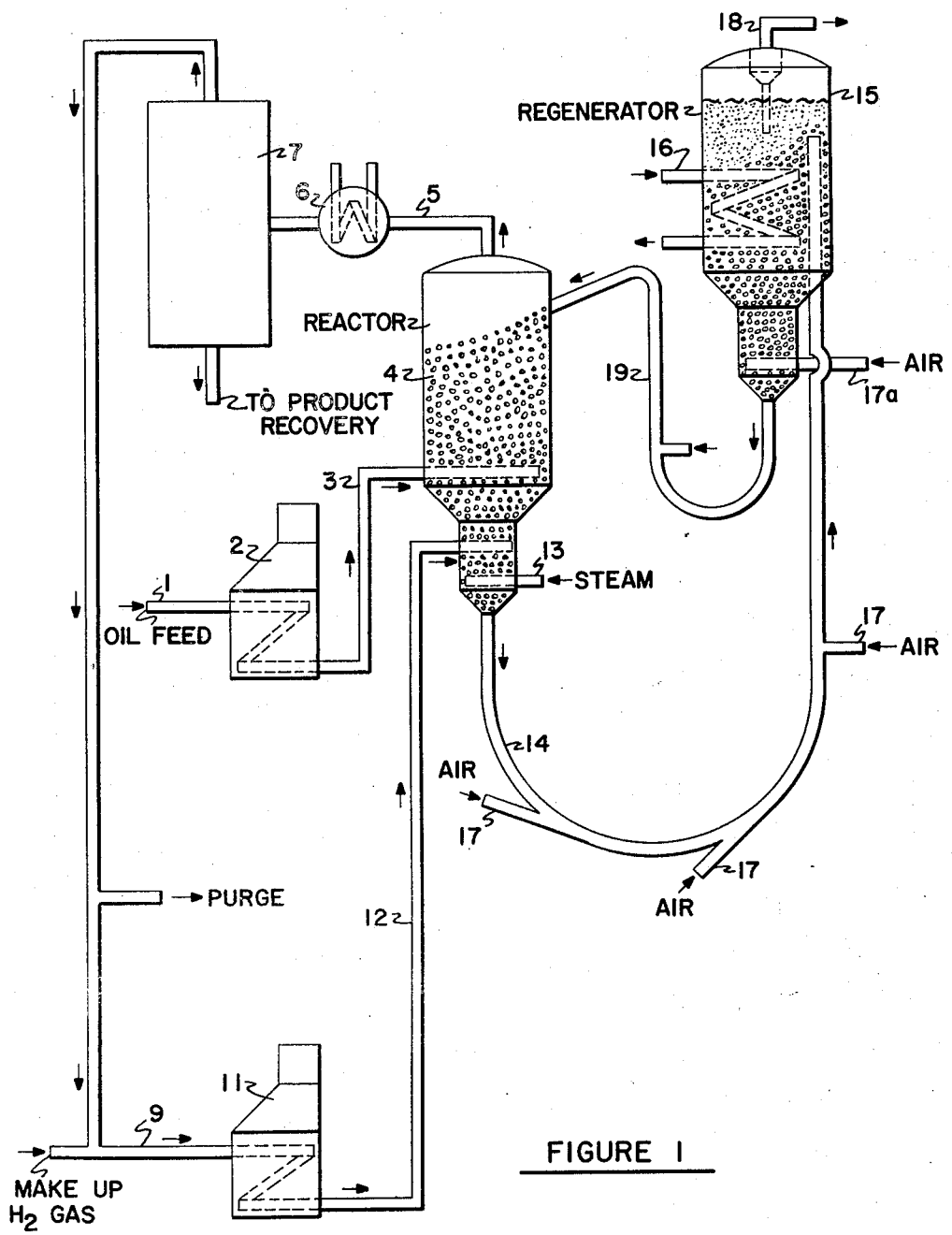

Nov. 10, 1959

D. D. MacLAREN 2,912,375

HYDROGENATION OF PETROLEUM OILS WITH "SHOT" SIZE
CATALYST AND REGENERATION CATALYST

Filed Dec. 23, 1957

2 Sheets-Sheet 1

Donald D. MacLaren    Inventor

By J. Cashman    Attorney

Donald D. MacLaren   Inventor

United States Patent Office 2,912,375
Patented Nov. 10, 1959

2,912,375

HYDROGENATION OF PETROLEUM OILS WITH "SHOT" SIZE CATALYST AND REGENERATION CATALYST

Donald D. MacLaren, Scotch Plains, N.J., assignor to Esso Research and Engineering Company, a corporation of Delaware Application December 23, 1957, Serial No. 704,718

6 Claims. (Cl. 208—213)

The present invention relates to a continuous method of hydrogenation of hydrocarbon oils. More particularly, it relates to an improved method for severe hydrodesulfurization and/or hydrodenitrogenation of petroleum oils in which the catalyst employed is of "shot" size and which catalyst operates in the manner of a moving bed and is further characterized in that the catalyst is withdrawn from the bottom of a treating zone and fed into the top of a regeneration zone where it undergoes regeneration in a fluid bed of inert solids and then is returned to the treating zone.

The severe hydrogenation of heavy hydrocarbon oils is characterized by rapid deactivation of the catalyst. Short cycle on-stream phases are found necessary to maintain catalyst activity at a reasonable level. For this reason conventional fixed bed operation is not practical for severe hydrogenation.

One method previously proposed to provide for frequent regeneration is slurry hydrogenation. As is known, the slurry operation is a liquid phase operation in which the catalyst is suspended in the oil.

The weakness of this process is that it is difficult, if not impossible, to separate the fine catalyst required in the slurry system from the unconverted feed. This requires that the catalyst be transported with the products through a product fractionator and returned to the reactor. Such a procedure may well result in severe coking of the catalyst. A second difficulty with the slurry process is that before regeneration the catalyst must first be stripped of treat gas in a fluid bed and then transferred to a second fluid bed thus necessitating a two-vessel regeneration system.

In the moving bed process, these two problems in the slurry operation are overcome. However, there is still the problem of expensive lock hoppers to permit regeneration of the catalyst in an air lift. Flue gas must also be circulated through this air lift in order to control regeneration temperature.

According to the present invention, it is proposed to use catalyst of larger size say 200 to 4000 microns but having a rather narrow range of particle size distribution. This catalyst would flow through the reactor downwardly as a moving bed. Because of the relatively large particle size of the catalyst, separation of the products and the catalyst would be readily accomplished. Feed would be injected near the bottom of the reactor and hydrogen-containing treat gas at a lower point to strip the moving bed of catalyst as it flows downwardly. Below the point where the treat gas inlet is located, steam would be injected at such a rate that with the movement of the catalyst, an interface of treat gas and steam would be maintained in the lower portion of the reactor. The stripped catalyst is then transported to a regenerator. This regenerator contains a bed of inert solids fluidized with air, at the top of which the "shot" catalyst would be introduced so that it settles through the fluid bed giving up its heat thereto. The heat released, by the regeneration is removed by a cooling coil. The "shot" catalyst is then stripped with air in the bottom of the regenerator and returned to the top of the reactor and the process repeated.

Figure 2:
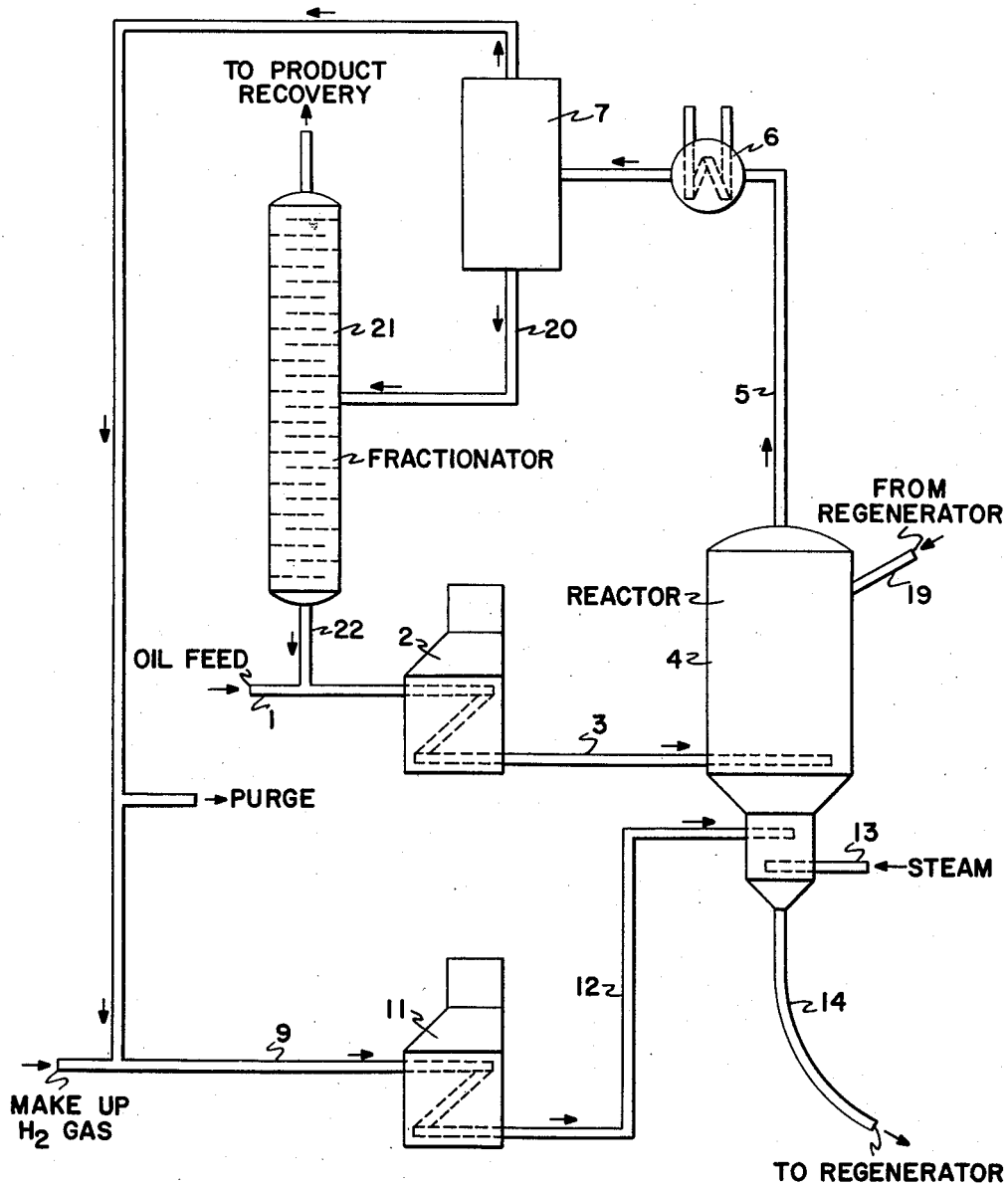

In the accompanying drawings, there is shown in Figure I a preferred embodiment of the invention specifically directed to the hydrodenitrogenation of raw shale oil; and in Figure 2 which is a fragment of Figure 1, there is shown an embodiment wherein a high boiling fraction of the product oil is recycled.

Similar reference characters refer to similar parts.

Referring in detail to the drawings, the raw shale oil is introduced through line 1 into a furnace 2 where it is heated and then withdrawn through 3 and passed into converter or treater 4 containing a moving bed of "shot" size catalyst. Simultaneously, hydrogen-containing treat gas is introduced into furnace 11 and withdrawn through line 12 and passed into treating zone 4. The liquid oil and vapors and hydrogen-containing gas pass upwardly to the downwardly moving bed of catalyst as a mixed phase of liquid and gas which fill the reactor. In other words, reactor 4 operates as a so-called "flooded" reactor. The product finally is withdrawn through line 5, passed through cooler 6 where it is cooled to temperatures low enough to condense liquid products then passed into separator 7 where the product is separated as bottoms and denitrogenated and desulfurized oil passes on to further processing. The hydrogen-containing gas is recycled to the treat zone through furnace 11 where it is heated to between 600 to 900° F. A portion of this recycle gas is purged and replaced with make-up hydrogen to maintain a high hydrogen partial pressure in the treat zone.

In vessel 4, steam is introduced through line 13 at such a rate that the steam and the hydrogen-containing gas entrained with the downwardly moving bed of catalyst form an interface. The catalyst meanwhile passes downwardly from the reactor through the hydrogen-steam interface and into transfer line 14 where it is conducted to a regeneration vessel 15. Air is introduced at various points 17 along transfer line 14 causing catalyst to flow upwardly to the top of vessel 15 which contains a bed of inert solids fluidized with air. Additional air is introduced through line 17(a) to elutriate the sand or inert material and to cause combustion of the carbonaceous material on the shot as it settles downwardly through the bed of inert solids or sand. The "shot" catalyst undergoes regeneration as it settles through the fluid bed. Regeneration temperatures are controlled by limiting the amount of air admitted to the transfer line and by a cooling coil 16 in the fluid bed of the regenerator. Flue gas is taken overhead through line 18. Regenerated catalyst is withdrawn from bottom of regenerator through line 19 and returned to a point near the top of a treater and the process is repeated. In Figure 2 the oil vapors and the hydrogen are withdrawn from the reactor 4 through line 5, cooled in 6 and are then conducted to separator 7 where as before, the hydrogen is taken off overhead and recycled through line 9 to furnace 11. The bottoms are taken off the separator 7 through line 20 and are charged to fractionation column 21. The main product is taken off overhead while the heavier or high boiling material is taken off from the bottom and recycled through line 22 to furnace 2 thence through line 3 to reactor 4.

Typical conditions for the denitrogenation of shale oil are as follows:

Conditions in treater:
| | |
|---|---|
| Catalyst composition | Cobalt molybdate on alumina. |
| Catalyst size | 700–900 microns. |
| Temperature, °F. | 825. |
| P.s.i.g. | 1000. |
| Oil feed rate | 0.5 v./v./hr. |
| Catalyst to oil ratio | 2. |
| Std. cubic feet of hydrogen barrel of feed | 6000. |
| Concentration of hydrogen, vol. percent | 80. |

Inspection of feed:
| | |
|---|---|
| Boiling range, °F. | 400–1100. |
| S, wt. percent | 0.7. |
| Nitrogen, wt. percent | 2.0. |

Yields percent on feed:
| | |
|---|---|
| Gasoline, vol. percent | 40. |
| Gas and coke, wt. percent | 14. |
| $H_2$ consumption, s.c.f./b. | 1600. |

Inspection of total liquid product:
| | |
|---|---|
| S, wt. percent | Nil. |
| Nitrogen, wt. percent | 0.1. |

Regeneration conditions:
| | |
|---|---|
| Temperature, °F. | 1050. |
| Pressure, p.s.i.g. | 1000. |
| Particle size of sand, avg. | 50 microns. |

The foregoing example is merely illustrative of the process. For example, the catalyst particle size may vary from 200 to 4000 microns in size. The temperature at which the hydrogenation is carried out may vary from 600 to 1000° F., the pressure may vary from 100 to 4000 p.s.i.g. The feed rate may vary from 0.1 to 16 w./hr./w. and the amount of hydrogen-containing treat gas may vary from about 50 cubic feet per barrel of feed to 10,000 cubic feet of hydrogen per barrel. The catalyst may contain molybdenum oxide carried on alumina as well as the better known cobalt molybdate on alumina. Any known hydrogenation catalyst may be employed.

To recapitulate briefly the present invention proposes the use of a "shot" size catalyst e.g. one having particle size of 200 micron size or greater which is introduced near the top of the treating zone and is caused to flow downwardly against the upward flowing treating gas and oil. After stripping with steam, the catalyst passes to the top of a regeneration zone containing fluidized sand or the like and settles downwardly against an upward flowing oxygen-containing gas such as air whereby the catalyst is regenerated. As the catalyst reaches the bottom of the regeneration, it is picked up in a hydrogen-containing gas and charged to the top of the reactor for further use in the process.

The present process has particular application to feed stocks which contain nitrogen and sulfur as part of ring compounds. Thus in the case of shale oil, nitrogen is present as kerogen and it requires a severe treatment to release this nitrogen. In other stocks, there are considerable quantities of thiophenes and related compounds which also require a severe hydrogenation to release the sulfur.

Many modifications of the present invention may be made by those familiar with the art without departing from the spirit thereof.

What is claimed is:

1. A continuous method for hydrogenating petroleum oils at 600° to 1000° F. and 100 to 4000 p.s.i.g. pressure which comprises charging the oil and hydrogen to a bottom portion of a treating vessel, charging a catalyst of "shot" size of at least 200 microns to an upper portion of the treating zone wherein it flows countercurrently downward against the upward flowing oil of space velocity from 0.1 to 16 w./hr./w. of catalyst and hydrogen-containing gas, permitting the oil, hydrogen and the catalyst to contact each other for a period of time sufficient to effect the desired conversion, withdrawing catalyst from the bottom of the treating zone conveying it to the top of a regeneration zone containing a bed of fluidized inert material of smaller particle size than the catalyst for removing heat therefrom, treating the catalyst with oxygen-containing gas introduced at a lower point of the regeneration zone whereby deposits on the catalyst are consummed by combustion and removed overhead as fumes, elutriating the inert material from the catalyst, returning the regenerated catalyst freed of deposits and of said inert material to an upper portion of the treating zone and recovering a hydrogenated product.

2. The method of claim 1 in which the oil to be hydrogenated is shale oil and in which the process is conducted under hydrogenation conditions for decomposing nitrogen and sulfur-containing ring compounds.

3. The method of claim 1 in which the inert material is sand of particle size averaging 50 microns.

4. A continuous method for hydrogenating under hydrogenation conditions at 600 to 1000° F. and 100 to 400 p.s.i.g. pressure raw shale oil which comprises charging the oil and hydrogen to a bottom portion of a treating vessel, charging a catalyst of at least 200 microns average particle size to an upper portion of a treating zone wherein it flows countercurrently downward against the upward flowing oil and hydrogen-containing gas, permitting the oil, hydrogen, and the catalyst to contact each other for a period of time sufficient to effect the desired conversion, withdrawing catalyst from the bottom of the treating zone conveying it to the top of a regeneration zone containing a fluidized bed of inert material of smaller particle size than the catalyst, treating the catalyst with an oxygen-containing gas introduced at a lower point of the regeneration zone whereby carbonaceous deposits on the catalyst are consummed by combustion and removed overhead as fumes, separating the regenerated catalyst from the fluidized inert material, returning the regenerated catalyst separated from said inert material to the upper portion of the treating zone and recovering a product substantially free of nitrogen and sulfur.

5. The methods set forth in claim 4 in which steam is admitted to a point in the treating zone below which the hydrogen is introduced whereby an interface of hydrogen and steam is formed in the said bottom portion of the treating zone.

6. In a continuous process for hydrogenating a hydrocarbon oil under hydrogenating conditions in the presence of a "shot" size catalyst of at least 200 micron particle size which is separated from the hydrocarbon oil by settling and withdrawn to a regeneration zone for regeneration, the improvement which comprises passing the withdrawn catalyst particles into a bed of fluidized inert solids having a smaller particle size than the catalyst within a regeneration zone, treating the catalyst as it settles downwardly through the fluidized inert solids with an upward flowing oxygen-containing gas that burns carbonaceous material on the catalyst and fluidizes said inert solids, controlling temperatures in said regeneration zone by cooling the fluidized inert solids, removing fumes overhead from said regeneration zone and separating the settled catalyst from the fluidized inert solids in said regeneration zone.

References Cited in the file of this patent

UNITED STATES PATENTS

| | | |
|---|---|---|
| 2,376,564 | Upham et al. | May 22, 1945 |
| 2,700,015 | Joyce | Jan. 18, 1955 |